United States Patent [19]
Sorensen

[11] Patent Number: 4,557,857
[45] Date of Patent: Dec. 10, 1985

[54] HIGH CONDUCTING POLYMER-METAL ALLOY BLENDS

[75] Inventor: Ian W. Sorensen, Bloomfield Hills, Mich.

[73] Assignee: Allied Corporation, Morris Township, Morris County, N.J.

[21] Appl. No.: 615,491

[22] Filed: May 30, 1984

[51] Int. Cl.[4] .......... C08K 3/08; H01B 1/02

[52] U.S. Cl. .......... 252/503; 252/506; 252/511; 252/512; 252/5; 524/439; 524/440; 524/505; 525/903

[58] Field of Search .......... 252/503, 506, 513, 512, 252/514, 511; 525/903; 524/505, 439, 440

[56] References Cited

U.S. PATENT DOCUMENTS

| | | | |
|---|---|---|---|
| 2,761,854 | 9/1956 | Coler | 260/38 |
| 3,085,988 | 4/1963 | Hull et al. | 260/33.6 |
| 3,345,115 | 11/1967 | Brandle et al. | 260/41 |
| 3,658,748 | 4/1972 | Anderson et al. | 260/37 EP |
| 3,976,600 | 8/1976 | Meyer | 252/511 |
| 4,022,749 | 5/1977 | Kuechler | 260/42.18 |
| 4,045,403 | 8/1977 | Lever et al. | 260/42.42 |
| 4,088,626 | 5/1978 | Gergen et al. | 260/42.18 |
| 4,200,973 | 5/1980 | Farkas | 252/511 |
| 4,248,743 | 2/1981 | Goettler | 260/17.4 |
| 4,302,553 | 11/1981 | Frisch et al. | 525/903 |
| 4,318,839 | 3/1982 | Newbould et al. | 524/538 |
| 4,351,746 | 9/1982 | Parish et al. | 252/511 |
| 4,465,804 | 8/1984 | Sorenson | 524/505 |
| 4,468,499 | 8/1984 | Siegfried et al. | 525/903 |

*Primary Examiner*—Herbert J. Lilling
*Attorney, Agent, or Firm*—James R. Ignatowski

[57] ABSTRACT

A high conducting polymer-alloy blend is prepared by stress blending a polymer having Non-Newtonian rheological behavior with a low melting temperature alloy to form an interpenetrating polymer-alloy network. The blend is performed at a temperature intermediate the solidus and liquidus temperatures of the alloy where the alloy has a fractional solidus imparting to the alloy a viscosity corresponding to the viscosity of the polymer. In the resulting blend, the interpenetrating polymer network is the stabilizing component of the high conducting polymer-alloy interpenetrating network and the interpenetrating alloy network provides the high conductance path.

18 Claims, No Drawings

HIGH CONDUCTING POLYMER-METAL ALLOY BLENDS

BACKGROUND OF THE INVENTION

1. Field of the Invention

The invention is related to electrically conductive polymer-metal alloy blends and in particular to an electrically conductive polymer-metal alloy blend having an interpenetrating polymer network.

2. Prior Art

Metals and/or carbon black are often combined with polymers to increase their electrical and thermal conductivities while maintaining ease of processing and low density such as taught by Meyer in U.S. Pat. No. 3,976,600. Usually the conductive material is in the form of flakes, fibers, or powder that are dispersed at fairly high concentrations throughout the polymer matrix. However, the electrical conductivity achieved for a given amount of added conductive material is low due to the discontinuities of the conducting phase. Alternatively it is known to use a wire mesh to provide a continuous electrical conductivity through the polymer-metal structure and achieve higher conductivity, but this approach suffers from limited applications and processability.

Coler in U.S. Pat. No. 2,761,854 discloses a different method for making high conductivity polymer-metal alloys in which the polymer powder particles are precoated with a metal film. The metal film coating on the polymer particles form a nearly continuous metallic network within the processed structure. The problem with this process is that metal films separate the individual polymer particles substantially weakening the physical structure of the molded structure or article.

The invention is a high conductivity polymer-metal alloy blend using a block copolymer as taught by Gergen et al in U.S. Pat. No. 4,088,626 or a particulate loaded polymer having non-Newtonian behavior as disclosed in patent application Ser. No. 411,922 filed June 28, 1982 and now abandoned.

SUMMARY OF THE INVENTION

The invention is a high electrically conductive interpenetrating polymer network in which the structure stabilizing polymer constituent has a Non-Newtonian rheological behavior exhibiting a determinable viscosity at a predetermined blending temperature and at a predetermined shear stress blending rate. The high electrically conductive interpenetrating network characterized by quantity of high electrically conductive dissimilar material stress blended with said polymer constituent to form a high electrically conductive interpenetrating polymer-conductive material network having a conductive material network intertwined with said structure stabilizing polymer. In the preferred embodiment, the high electrically conductive material is a low melting temperature metal or metal alloy. The advantage of the invention is that the conductive material network is continuous thereby providing a high electrically conductive path through the interpenetrating polymer-metal network. Another advantage of the invention is that the polymer network is also continuous providing a structurally integral stabilizing polymer network throughout the interpenetrating polymer-metal network. These and other advantages of the invention will become more apparent from a reading of the detailed description of the invention.

DETAILED DESCRIPTION OF THE INVENTION

The high conducting polymer-metal alloy blend is an extension of the interpenetrating network formation technology described by Gergen et al in U.S. Pat. No. 4,088,626 in which a low melting temperature metal or alloy is substituted for the at least one dissimilar engineering thermoplastic resin of Gergen et al's polymer network. As is known in the art, interpenetrating polymer networks comprise a network stabilizing phase, such as the selectively hydrogenated monoalkenye arene-diene block copolymer and at least one engineering thermoplastic resin stress blended at an elevated temperature to form at least one partially continuous network phase which interlocks with the other dissimilar polymer. The key to the formation of the interpenetrating network is the Non-Newtonian behavior of the block copolymer which exhibits a yield stress in the melt. Below the critical yield stress, the block copolymer behaves like an elastic solid, while above the critical yield stress Non-Newtonian flow occurs. Therefore when the blending of the thermoplastic alloy containing such a block copolymer is stopped, the stress on the block copolymer is removed and it becomes "frozen" in its stressed configuration forming the structure stabilizing interpenetrating network of the polymer blend.

In the formation of interpenetrating polymer networks, referred to as IPN's, it has not been shown conclusively that the two constituents must have similar rheological properties. Further, it is known empirically that interpenetrating networks are most easily formed when the viscosities of the two constituents are similar at the blending temperature.

The invention is the formation of an inter-penetrating polymer network in which a copolymer, such as taught by Gergen et al in U.S. Pat. No. 4,088,626 or by a particulate loaded polymer such as taught in U.S. patent application Ser. No. 411,922 filed June 28, 1982 is the structure stabilizing constituent and a low melting temperature metal or metal alloy is substituted for the dissimilar engineering thermoplastic resin.

With a continuous network, as obtained with interpenetrating polymer networks, only small amounts of metal are required to achieve high electrical conductivity. For example, a 10 percent by weight dispersion of a metal in a typical non-conducting polymer would have essentially zero electrical conductivity, i.e., an insulator. This is the result of the metal particles being separated by the insulating polymer. However, if the same quantity of metal were incorporated as one of the constituents of an interpenetrating network, the resulting conductivity would be significantly higher. More specifically if the metal or metal alloy has a density of 7 grams/cc and a conductivity of $5.9\times10^4$ mho/cm (one-tenth that of copper) and the structure stabilizing polymer or block-copolymer has a density of approximately 1 gram/cc, it can be shown that the conductivity of the interpenetrating polymer-metal network blend would have a conductivity of approximately 300 mho/cm. This value is well within the range of 10 to $10^6$ mho/cm generally accepted for metals.

The interpenetrating polymer-metal network blend is obtained by stress blending the metal and polymer constituents in powder or small pellet form at an elevated temperature. For example, the stress blending may be performed in a twin screw extruder at a temperature at which the metal is in partially melted state as shall be explained hereinafter. As a result, co-continuous interpenetrating networks of the metal and polymer are formed.

The temperature and shear stress at which the stress blending is performed are selected such that the metal and structure stabilizing polymer constituent have approximately the same viscosity. Preferably, the ratio of the viscosity of the metal or metal alloy at the blending temperature to the viscosity of the polymer at the blending temperature and the imposed shear stress rate is between 0.8 and 1.2. As previously indicated the structure stabilizing polymer constituent has Non-Newtonian rheological properties such that its viscosity can be controlled as a function of the shear stress imposed by twin screw extruder.

In a like manner the viscosity of the metal or metal alloy can be controlled as a function of temperature. As discussed by Laxmanan and Flemings in their article "Deformation of Semi-Solid SN-15 Pct Pb Alloy" *Metallurgical Transactions A,* Vol. 11A, December 1980, incorporated herein by reference, the viscosity of semi-solid metal alloys varies as a function of the fraction solid (f) and shear rate. The semi-solid state of a metal or alloy is defined as a state in which the metal or alloy is part liquidus and part solidus. This corresponds to the "slush" state of water at 0° C. where both water and ice crystal states coexist. This state occurs at the melting point of the metal and some alloys. However, for many low temperature alloys, the liquidus and solidus temperatures are different, that is they do not have a well defined melting point, and a temperature range exists between the solidus and liquidus temperatures in which the liquid and solid state of the alloy coexist. The "fraction solid" is the fraction of the total quantity of alloy that is in the solid state at any given temperature in the temperature range between the solidus and liquidus temperatures. For example, the Sn-15 Pct Pb alloy discussed in the Laxmanan and Flemings article has a solidus temperature of 183° C. and a liquidus temperature of 205° C. giving rise to a temperature range of 22° C. over which the alloy goes from a solid to a complete liquid. Other examples of alloys which have different solidus and liquidus temperatures, taken from the "Guide to Indalloy Specialty Solders" publish by the Indium Corporation of American, Utica, N.Y., are given on the Table 1 below:

TABLE 1

| Alloy | Solidus Temperature | Liquidus Temperature |
|---|---|---|
| 95 In, 5 Bi | 125° C. | 150° C. |
| 85 Sn, 15 Pb | 183° C. | 205° C. |
| 95 Bi, 5 Sn | 134° C. | 251° C. |
| 97 Sn, 3 CU | 227° C. | 300° C. |
| 95 Pb, 5 Ag | 305° C. | 364° C. |
| 95 Cd, 5 Ag | 340° C. | 390° C. |
| 82 Au, 18 In | 451° C. | 485° C. |
| 92.5 Al, 7.5 Si | 577° C. | 630° C. |
| 80 CU, 15 Ag, 5P | 640° C. | 705° C. |

The alloys listed on the table above represent only a small number of the alloys listed in the "Guide to Indalloy Speciality Solders" which have different solidus and liquidus temperatures. It is therefore possible to select an alloy which will have a viscosity similar to the viscosity of the structure stabilizing polymer at the blending temperature and blending stress rate. The viscosity of the metal or metal alloy being controlled by the selection of a blending temperature which produces the desired fraction solid.

As a specific example, a high conducting polymer-metal alloy blend may be formed by blending a tin-lead metal alloy with polyethylene loaded with carbon black. The alloy is a commercially available tin-lead alloy having 85 percent tin and 15 percent lead manufactured by the Indium Corporation of America of Utica, N.Y. As shown in Table 1, this alloy has a solidus tempterature at 183° C. and a liquidus temperature at 205° C. The polyethylene is commerically available. Petrothene NA-202 manufactured by U.S. Industrial Chemicals Co. of New York, N.Y. Prior to blending with the tin-lead alloy, the polyethylene is preloaded with 30 percent carbon black by weight to impart to the polyethylene a Non-Newtonian rheological behavior having a viscosity comparable to that of the tin-lead alloy at 200° C. The carbon black is Vulcan XC-72 commercially available from the Cabot Corporation of Boston, Mass.

Equal parts, by weight of the lead-tin alloy and the carbon black loaded polyethylene are then stress blended at 200° C. in a twin screw extruder to form a high conducting polymer-metal alloy blend. The blending at the elevated temperature is preferably done in an inert atmosphere, such as a nitrogen atmosphere, to retard the oxidation of the contituents of the metal alloy.

The high conducting interpenetrating network polymer-metal alloy is not limited to two constituents. As is known in the art, a third or even fourth constituent may be added to enhance the structural properties. Further, the invention is not limited to using block copolymers as the structure stabilizing constituent and that particulate loaded polymers having Non-Newtonian behavior may be used in place of the block-copolymers as the structure stabilizing constituent as in the above example, without departing from the spirit of the invention.

Having described the invention, what is claimed is:

1. A high conducting polymer-metal alloy comprising:

at least a first quantity of a polymer having a Non-Newtonian rheological behavior exhibiting a determinable viscosity at a predetermined blending temperature and a predetermined shear stress blending rate; and at least a second quantity of a low melting temperature metal alloy blended with said first quantity of said polymer at said predetermined blending temperature and said predetermined shear stress rate to form an interpenetrating polymer-metal alloy network.

2. The polymer-metal alloy of claim 1 wherein said polymer is a block copolymer.

3. The polymer-metal alloy of claim 2 wherein said low melting temperature metal alloy has a viscosity at said blending temperature comparable to said determinable viscosity at said predetermined blending temperature and said predetermined shear stress blending rate.

4. The polymer-metal alloy of claim 3 wherein the ratio of the viscosity of said metal alloy at said blending temperature to said determinable viscosity is between 0.8 and 1.2.

5. The polymer-metal alloy of claim 1 wherein said polymer-metal alloy further includes a third quantity of particulates pre-blended with said polymer to impart to said polymer a Non-Newtonian rheological behavior having said determinable viscosity at said blending temperature.

6. The polymer-metal alloy of claim 5 wherein said low melting temperature metal alloy has a viscosity at said blending temperature comparable to said determinable viscosity at said predetermined blending temperature and said predetermined shear stress blending rate.

7. The polymer-metal alloy of claim 6 wherein the ratio of the viscosity of said metal alloy at said predetermined blending temperature to said determinable viscosity is between 0.8 and 1.2.

8. A high electrically conductive interpenetrating polymer network having a structure stabilizing polymer constituent, said polymer constituent having a Non-Newtonian rheological behavior exhibiting a determinable viscosity at a predetermined blending temperature and a predetermined shear stress rate, said high electrically conductive interpenetrating polymer network characterized by a second quantity of a metal having a viscosity at said predetermined blending temperature comparable to said determination viscosity stress blended with said first quantity of polymer constituent to form a high electrically conductive interpenetrating network with said polymer constituent.

9. The interpenetrating polymer network of claim 8 wherein said metal is a low melting temperature metal having a viscosity at said predetermined blending temperature whose value ranges from 0.8 to 1.2 times said predetermined viscosity.

10. The interpenetrating polymer network of claim 8 wherein said metal is a metal alloy having a viscosity at said predetermined temperature comparable to said determinable viscosity.

11. The interpenetrating polymer network of claim 8 wherein said metal is a metal alloy having a viscosity at said predetermined temperature whose value ranges from 0.8 to 1.2 times said determinable viscosity.

12. The interpenetrating polymer network of claim 8 wherein said polymer is a block copolymer having said Non-Newtonian rheological properties.

13. The interpenetrating polymer network of claim 8 wherein said polymer is pre-loaded with a quantity of particulates determined to impart to said polymer said Non-Newtonian rheological behavior.

14. A method for making a high electrically conductive interpenetrating polymer network having at least one structure stabilizing constituent characterized by the steps of:

mixing in powder or pellet form at least a first quantity of a polymer having Non-Newtonian rheological properties with a second quantity of a low melting temperature metal having viscosity comparable to viscosity of said polymer at a predetermined temperature and a predetermined shear stress rate to form a blend mixture;

heating said blend mixture to said predetermined blending temperature;

shear stress blending said heated blend mixture to form an interpenetrating polymer-metal network; and terminating said shear stress blending to freeze said interpenetrating polymer-metal network with said polymer being the structure stabilizing constituent.

15. The method of claim 14 wherein said polymer is a block-copolymer having Non-Newtonian rheological properties.

16. The method of claim 14 wherein said step of mixing is preceded by the step of pre-loading said polymer with a quantity of particulates determined to give said polymer said Non-Newtonian rheological properties.

17. The method of claim 15 wherein said metal is a low melting temperature metal alloy.

18. The method of claim 16 wherein said metal is a low melting temperature metal alloy.

* * * * *